United States Patent
Aoki (10) Patent No.: US 7,305,003 B2
(45) Date of Patent: Dec. 4, 2007

(54) NETWORK-LOAD DISPERSION SYSTEM, METHOD THEREFOR, AND RECORDING MEDIUM RECORDED WITH PROGRAM FOR ACHIEVING THIS METHOD

(75) Inventor: Yoshikazu Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 760 days.

(21) Appl. No.: 10/075,027

(22) Filed: Feb. 14, 2002

(65) Prior Publication Data

US 2002/0073147 A1 Jun. 13, 2002

Related U.S. Application Data

(63) Continuation of application No. PCT/JP99/04438, filed on Aug. 18, 1999.

(51) Int. Cl.
*H04L 12/403* (2006.01)

(52) U.S. Cl. ............. 370/449; 370/252; 370/346; 709/224

(58) Field of Classification Search .......... 370/237, 370/346, 449–457; 718/105; 710/15–19, 710/44, 46, 210; 709/223–225; 379/92.01; 725/16
See application file for complete search history.

(56) References Cited

U.S. PATENT DOCUMENTS

| | | | | |
|---|---|---|---|---|
| 5,974,237 | A | * 10/1999 | Shurmer et al. | 709/224 |
| 6,507,565 | B1 | * 1/2003 | Taylor | 370/252 |
| 6,665,702 | B1 | * 12/2003 | Zisapel et al. | 718/105 |

FOREIGN PATENT DOCUMENTS

| | | |
|---|---|---|
| JP | 60-212053 | 10/1985 |
| JP | 61-208340 | 9/1986 |
| JP | 2-48842 | 2/1990 |
| JP | 2-131044 | 5/1990 |
| JP | 6-14371 | 1/1994 |
| JP | 8-32578 | 2/1996 |
| JP | 9-8818 | 1/1997 |
| JP | 10-327148 | 12/1998 |
| JP | 11-88379 | 3/1999 |

* cited by examiner

*Primary Examiner*—Doris H. To
*Assistant Examiner*—Habte Mered
(74) *Attorney, Agent, or Firm*—Staas & Halsey LLP (57) ABSTRACT

A system for dispersing the load of a network that can avoid local traffic congestion in a communication route within a broadband network is provided.

The system for dispersing the load of a network in data communications between a central computer and a plurality of remote nodes that are connected to the central computer via a broadband network, wherein the central computer is constructed of: a unit that determines an order of communications between the central computer and the plurality of remote nodes, in order to avoid local traffic congestion in a communication route within the broadband network; a unit that determines a communication interval between a remote node with which the central computer communicates this time and a remote node with which the central computer communicates next time, among the plurality of remote nodes that communicate with the central computer; and a unit that controls data communications between the central computer and the plurality of remote nodes, according to the communication order and the communication interval.

12 Claims, 3 Drawing Sheets

NETWORK-LOAD DISPERSION SYSTEM, METHOD THEREFOR, AND RECORDING MEDIUM RECORDED WITH PROGRAM FOR ACHIEVING THIS METHOD

CROSS-REFERENCE TO RELATED APPLICATIONS

This application is a continuation of PCT/JP99/04438, filed on Aug. 18, 1999, the contents being incorporated herein by reference.

BACKGROUND OF THE INVENTION

1. Field of the Invention

The present invention relates to a system for dispersing the load of a network, a method therefor, and a recording medium recorded with a program for executing this method, in data communications between a central computer and a plurality of remote nodes that are connected to this central computer via a broadband network. Particularly, this invention relates to a system for dispersing the load of a network, a method therefor, and a recording medium recorded with a program for executing this method, in a network in which a monitoring unit carries out polling by avoiding a local busy status of network traffic in order to monitor a plurality of remote nodes that are connected via a broadband network.

2. Description of the Related Art

Nowadays, in the information community, data communications have been carried out between a central computer and a plurality of remote computers that are connected to this central computer via a network. Further, in recent years, high-speed transmission and the application of multimedia have become increasingly important in a broadband network that realizes communications between LANs. High-speed data communications including image data have become accordingly important.

As broadband networks, there are a B-ISDN (Broadband Integrated Services Digital Network) that is based on an asynchronous transfer mode (ATM) for covering transmission speeds to a few M-bits/sec., a frame relay system for covering transmission speeds up to about 1.5 M-bits/sec., and a network that is based on an SMDS (Switched Multimegabit Data Service) that is a connection-less data communication system for covering transmission speeds of a few M-bits/sec. to a few tens of M-bits/sec.

In a data communication system in which a plurality of remote computers are connected to a central computer via a broadband network, the central computer monitors the plurality of remote computers as follows. The central computer transmits mails to the plurality of remote computers, and the remote computers receive these mails and send return mails to the central computer. When the central computer carries out polling to the plurality of remote computers, the data communications are usually carried out according to the IP (Internet Protocol).

However, in the above data communication system, there is the following problem. The central computer does not know through which communication route of the broadband network the central computer carries out data communications with the remote computers. For monitoring or other purpose, the host computer as a mail transmission origin sequentially transmits data to the plurality of remote computers that are the mail arrival destinations, according to the IP addresses. Then, the central computer receives return mails from these remote computers. During this period, there may occur local traffic congestion in the communication routes within the broadband network. As these routes become busy, there may occur time periods when data communications, used for other business, will be unavailable.

SUMMARY OF THE INVENTION

It is, therefore, an object of the present invention to provide a system, for dispersing the load of a network, that can solve the above problem and avoid local traffic congestion in a communication route within a broadband network, a method therefor, and a recording medium recorded with a program for executing this method.

In order to achieve the above object, according to a first aspect of the present invention, there is provided a system for dispersing the load of a network in data communications between a central computer and a plurality of remote nodes that are connected to the central computer via a broadband network, wherein the central computer comprises: a communication order determining unit that determines an order of communications between the central computer and the plurality of remote nodes, in order to avoid local traffic congestion in a communication route within the broadband network; a communication interval determining unit that determines a communication interval between a remote node with which the central computer communicates this time and a remote node with which the central computer communicates next time, among the plurality of remote nodes that communicate with the central computer; and a communication control unit that controls data communications between the central computer and the plurality of remote nodes, according to the communication order and the communication interval.

According to a second aspect of the invention, there is provided a system for dispersing the load of a network according to the above aspect, wherein the communication interval is obtained as follows: a repetition period for repetitively executing communications with the whole plurality of remote nodes is divided by a total number of the remote nodes, and a quotient obtained is subtracted by a processing time per one node thereby to obtain the communication interval which includes a communication waiting time.

According to a third aspect of the invention, there is provided a system for dispersing the load of a network according to the above aspect, wherein the plurality of remote nodes are divided into groups of a plurality of transmission lines, and the frequency that the transmission lines divided into the groups are used for communications is increased in proportion to the number of remote nodes that are accommodated in the divided groups of transmission lines.

According to a fourth aspect of the invention, there is provided a system for dispersing the load of a network according to the above aspect, wherein the plurality of remote nodes are divided into groups of a plurality of transmission lines, and the frequency that the transmission lines divided into the groups are used for communications is increased in proportion to the line speeds of the divided transmission lines.

In order to achieve the above object, according to a fifth aspect of the invention, there is provided a system for dispersing the load of a network in a monitoring unit that carries out polling to a plurality of nodes to be monitored that are connected via a broadband network, wherein the monitoring unit comprises: a polling order determining unit that determines an order of polling the plurality of nodes to be monitored; a polling interval determining unit that determines a polling interval between the nodes to be monitored; and a control unit that controls the monitoring unit to carry out polling of the plurality of nodes to be monitored, according to the polling order and the polling interval.

In order to achieve the above object, according to a sixth aspect of the invention, there is provided a method of dispersing the load of a network in data communications between a central computer and a plurality of remote nodes that are connected to the central computer via a broadband network, the method comprising the steps of: determining an order of communications between the central computer and the plurality of remote nodes, in order to avoid local traffic congestion in a communication route within the broadband network; determining a communication interval between a remote node with which the central computer communicates this time and a remote node with which the central computer communicates next time, among the plurality of remote nodes that communicate with the central computer; and controlling data communications between the central computer and the plurality of remote nodes, according to the communication order and the communication interval.

According to a seventh aspect of the invention, there is provided a method of dispersing the load of a network according to the above aspect, wherein the communication interval is obtained as follows: a repetition period for repetitively executing communications with the whole plurality of remote nodes is divided by a total number of the remote nodes, and a quotient obtained is subtracted by a processing time per one node thereby to obtain the communication interval which includes a communication waiting time.

According to an eighth aspect of the invention, there is provided a method of dispersing the load of a network according to the above aspect, wherein the plurality of remote nodes are divided into groups of a plurality of transmission lines, and the frequency that the transmission lines divided into the groups are used for communications is increased in proportion to the number of remote nodes that are accommodated in the divided groups of transmission lines.

According to a ninth aspect of the invention, there is provided a method of dispersing the load of a network according to the above aspect, wherein the plurality of remote nodes are divided into groups of a plurality of transmission lines, and the frequency that the transmission lines divided into the groups are used for communications is increased in proportion to the line speeds of the divided transmission lines.

In order to achieve the above object, according to a tenth aspect of the invention, there is provided a method of dispersing the load of a network in a monitoring unit that carries out polling to a plurality of nodes to be monitored that are connected via a broadband network, the method comprising the steps of: determining an order of polling the plurality of nodes to be monitored; determining a polling interval between the nodes to be monitored; and controlling the monitoring unit to carry out polling of the plurality of nodes to be monitored, according to the polling order and the polling interval.

In order to achieve the above object, according to an eleventh aspect of the invention, there is provided a computer-readable recording medium recorded with a program that is used in a system for dispersing the load of a network in data communications between a central computer and a plurality of remote nodes that are connected to the central computer via a broadband network, wherein the recording medium has been recorded with a program for making the central computer function as: a communication order determining unit that determines an order of communications between the central computer and the plurality of remote nodes, in order to avoid local traffic congestion in a communication route within the broadband network; a communication interval determining unit that determines a communication interval between a remote node with which the central computer communicates this time and a remote node with which the central computer communicates next time, among the plurality of remote nodes that communicate with the central computer; and a communication control unit that controls data communications between the central computer and the plurality of remote nodes, according to the communication order and the communication interval.

DETAILED DESCRIPTION OF THE PREFERRED EMBODIMENTS

Figure 1:
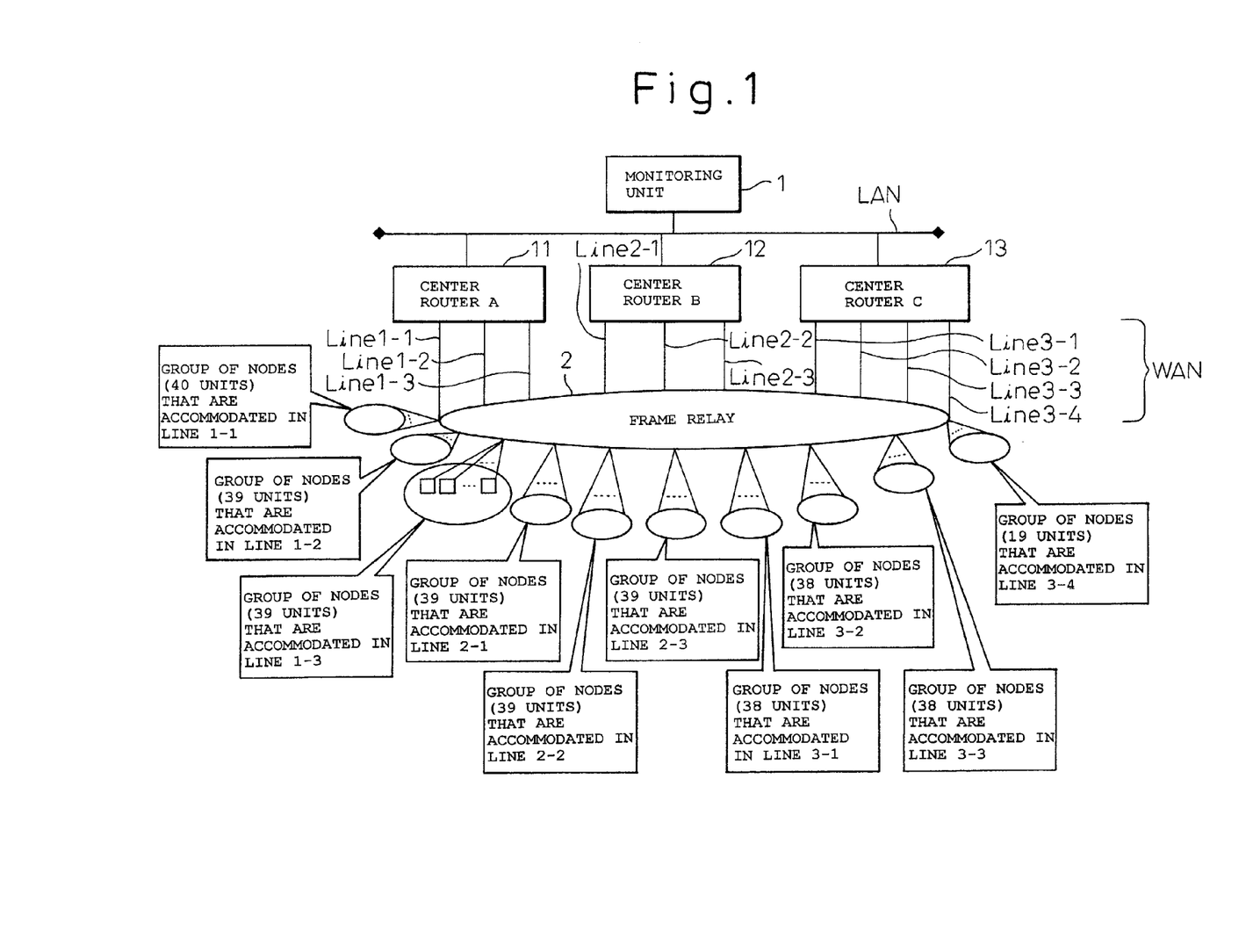
FIG. 1 is a schematic structure diagram of a system for dispersing the load of a network according to one embodiment of the present invention.

FIG. 1 is a schematic structure diagram of a system for dispersing the load of a network according to one embodiment of the present invention. In FIG. 1, a monitoring unit 1 is connected to three center routers A, B and C indicated by reference numbers 11 to 13 respectively, via a LAN. The center routers 11 to 13 are connected to 386 remote nodes in total (hereinafter, to be simply referred to as a node) via a frame relay 2 as a broadband network. A network between the center routers 11 to 13 and the 386 nodes is constructed of a WAN (Wide Area Network) that has a relatively low transmission speed compared to that of the LAN.

The center router 11 is connected to nodes that are divided into three groups corresponding to transmission lines 1-1, 1-2, and 1-3 respectively, through these transmission lines and via the frame relay 2. The center router 12 is connected to nodes that are divided into three groups corresponding to transmission lines 2-1, 2-2, and 2-3 respectively, through these transmission lines and via the frame relay 2. The center router 13 is connected to nodes that are divided into four groups corresponding to transmission lines 3-1, 3-2, 3-3, and 3-4 respectively, through these transmission lines and via the frame relay 2. The total 386 nodes that are divided into these ten groups are connected to the monitoring unit 1 via the frame relay 2.

Each of the transmission lines 1-1, 1-2, 1-3, 2-1, and 3-3 has a transmission speed of 768 Kbps, and the transmission line 3-4 has a transmission speed of 384 Kbps. Further, each node has a transmission speed of 64 Kbps.

In the example shown in FIG. 1, each group of the nodes is constructed of 19 nodes, 38 nodes, or 40 nodes. Each node is on an individual LAN not shown, and a server and clients are connected on this LAN. In the present embodiment, each node is an object that is to be monitored. It is also possible to structure the embodiment of the present invention such that the server and the clients on the LAN connected to each node become objects that are to be monitored.

In monitoring the 368 nodes, the monitoring unit 1 does not carry out polling based on the IP address of each node.

Instead, in order to avoid local traffic congestion in a communication route within the WAN, the monitoring unit 1 carries out polling as follows by taking into account the dispersion of the load of the network.

Figure 2:
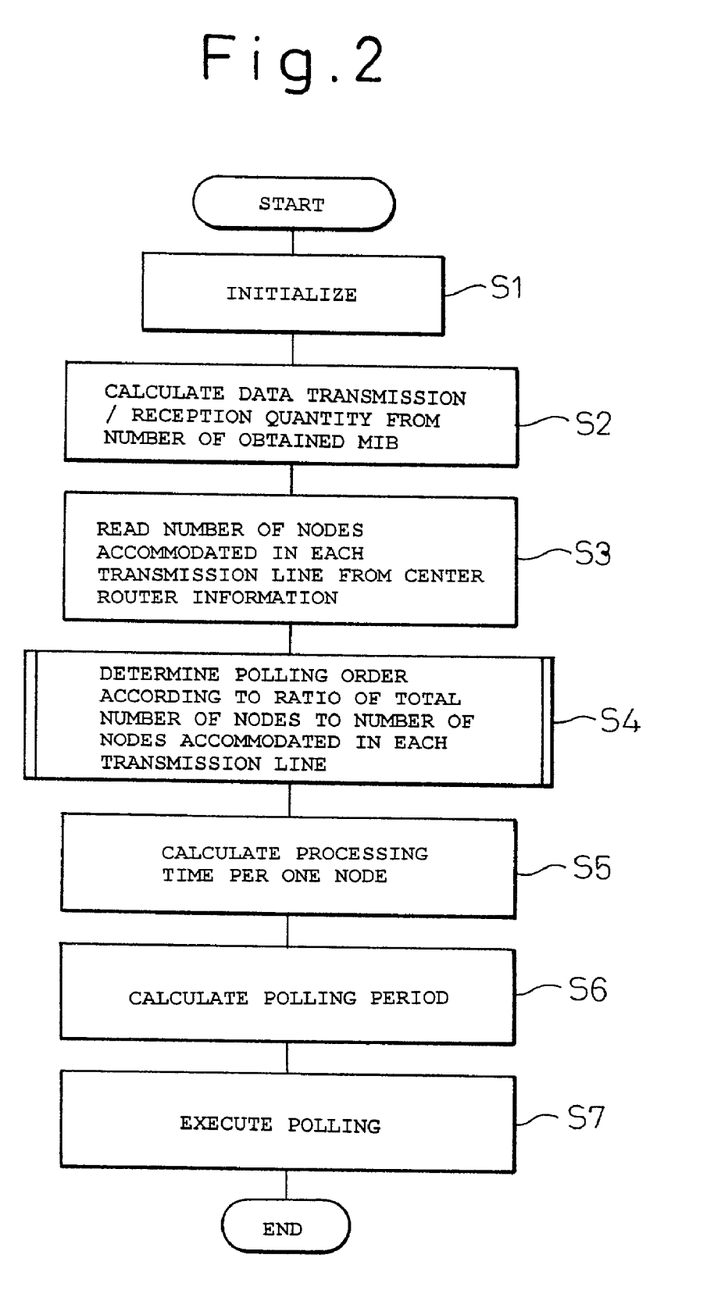
FIG. 2 is a flowchart that shows a processing order of a monitoring unit.

FIG. 2 is a flowchart that shows a processing order of the monitoring unit.

First, the monitoring unit 1 carries out initialization at step S1. In other words, the monitoring unit 1 collects center router information from the center routers 11 to 13, and sets polling information.

1. The center router information includes the following.

① Names of transmission lines that are connected to respective center lines, that is, the transmission lines 1-1, 1-2, 1-3, 2-1, - - - , 3-3, and 3-4.

② IP addresses of nodes that are accommodated in respective transmission lines.

③ Line speeds of transmission lines, that is, the transmission speed 768 Kbps of the transmission lines 1-1, 1-2, 1-3, 2-1, - - - , and 3-3, respectively, and the transmission speed 384 Kbps of the transmission line 3-4.

2. The polling information includes the following.

① A processing time of the monitoring unit, for example, 0.01 sec.

② A polling period, for example, 15 min.

The polling period is a repetition period of polling the whole nodes at the time of polling the whole node for the purpose of monitoring.

③ A number of MIB obtained, for example, ten per one polling.

④ A maximum node response time, for example, 0.1sec.

The maximum node response time is a node response time that is a longest among the response times of the whole nodes.

⑤ Line efficiency, for example, 90%.

The line efficiency is approximately 90%, as the broadband network is constructed of frame relays. The line efficiency is approximately 80% when the broadband network is constructed of a B-ISDN.

Next, at step S2, the monitoring unit 1 calculates a data transmission/reception quantity from the number of obtained MIB, based on the following expression (1).

Data transmission/reception quantity=number of obtained MIB×average size of packets transmitted/received - - - (1)

The MIB (Management Information Base) is information that the network monitoring protocol of the IP base uses. In this case, the MIB is notification information that is transmitted from a node to the monitoring unit in response to an operation instruction from the monitoring unit to the node. The number of MIB corresponds to a number of pieces of notification information that are obtained from a node during a period while the monitoring unit carries out polling to one node.

At step S3, the monitoring unit 1 reads the number of nodes that are accommodated in each transmission line from the center router information.

At step S4, a communication order determining unit of the monitoring unit determines an order of polling the nodes according to a ratio of the total number of nodes to the number of nodes accommodated in each transmission line. This processing will be explained in detail below with reference to FIG. 3.

Figure 3:
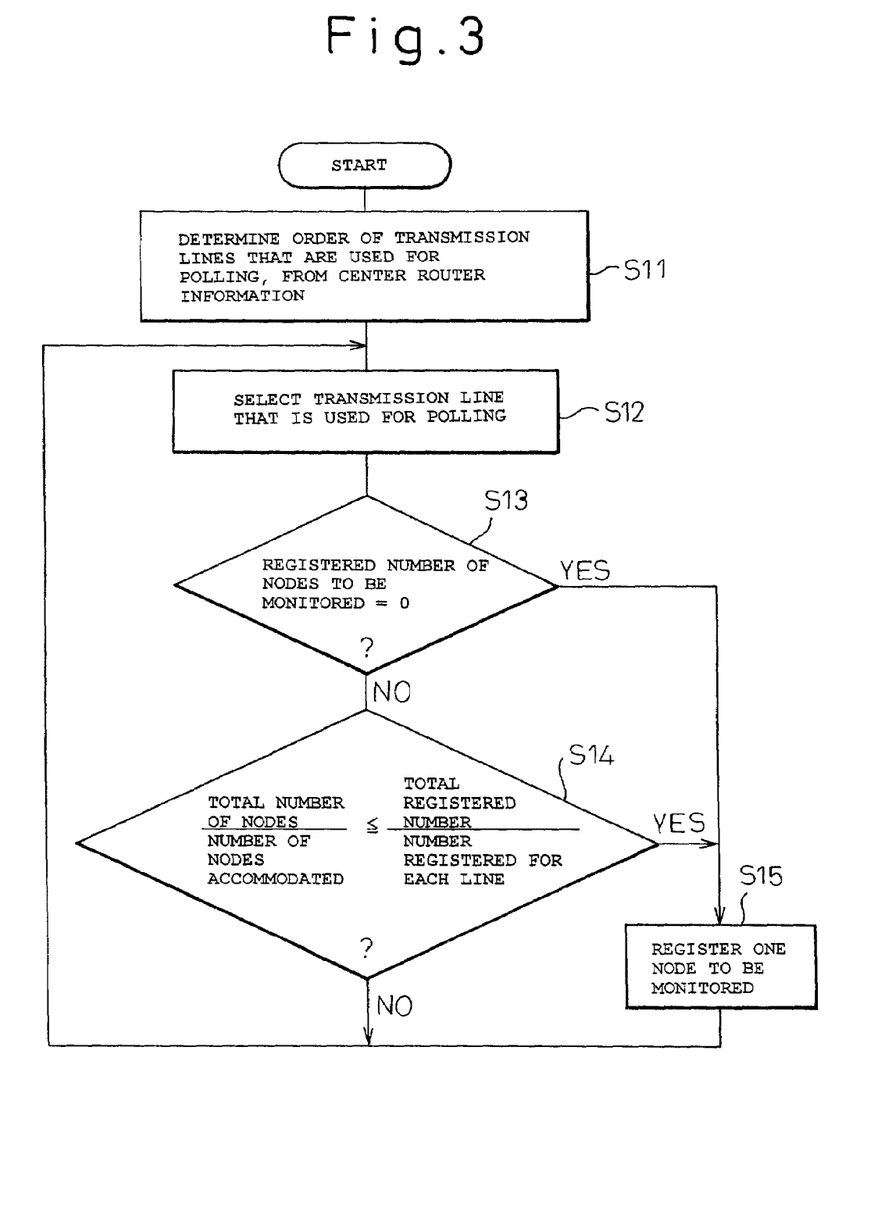
FIG. 3 is a flowchart that shows a processing order for determining an order of polling nodes to be monitored.

FIG. 3 is a flowchart that shows a processing order for determining the order of polling nodes that are to be monitored.

At step S11, the monitoring unit arranges center router information for each transmission line, and determines the order of transmission lines that are used for the polling. For example, the monitoring unit determines that the transmission lines are repeated as follows: the transmission line 1-1→the line 1-2→the line 1-3→the line 2-1→→- - - the line 3-3→the line 3-4.

At step S12, the monitoring unit selects one transmission line according to the order of the transmission lines to be used for the polling that has been determined at step S11.

Next, the monitoring unit executes steps S13 to S15 to the transmission line that has been selected at step S12, and sequentially registers the nodes to be monitored.

In this case, the "register" means to execute the polling of the nodes that are to be monitored.

At step S13, the monitoring unit judges whether the registered number of nodes to be monitored in the transmission line selected at step S12 is equal to 0 or not. When a result of this judgment is YES, the monitoring unit proceeds to step S15 in order to register a first node to be monitored that is accommodated in the selected transmission line. When a result of this judgment is NO, the monitoring unit proceeds to step S14 in order to register a second node, and others, that are to be monitored.

At step S14, the monitoring unit judges whether the following expression (2) is satisfied or not. When a result of this judgment is YES, the monitoring unit judges that it is necessary to register a node to be monitored, and the monitoring unit proceeds to step S15. When a result of this judgment is NO, the monitoring unit judges that it is not necessary to register a node to be monitored, and returns to step S12.

Total number of nodes/number of nodes accommodated≦total registered number/number registered for each line - - - (2)

In the above expression (2), the total registered number means the total number of nodes to be monitored that have passed step S15. The number registered for each line means the number of nodes to be monitored for each line that have passed step S15. Based on the above expression (2), the dispersion of the load of the transmission lines is averaged. For example, the number of nodes accommodated in the line 3-4 is 19, and this number is approximately a half of the number of nodes accommodated in other transmission lines. Therefore, this number is not registered each time, and the number is registered every other time.

At step S15, the monitoring unit registers one new node to be monitored, and updates the total registered number and the registered number for each line Referring back to FIG. 2, at step S5, the monitoring unit calculates a processing time per one node, from a data transmission/reception quantity, a line speed of a transmission line, a maximum node response time, and the processing speed of the monitoring unit, based on the following expression (3).

Processing time per one node=(data transmission & reception quantity/line speed of a transmission line×line efficiency)+maximum node response time+processing speed of the monitoring unit - - - (3)

At step S6, the monitoring unit calculates the polling period based on the following expression (4).

Polling waiting time=
  polling period/total number of nodes −processing time per one node - - - (4)

At step S7, a communication interval determining unit of the monitoring unit executes the polling to each node, based on the polling waiting time that has been calculated at step S6 and according to the order of monitored nodes to be polled that has been determined at step S4.

The monitoring unit carries out the polling to each node, according to the polling waiting time and the polling order, as explained above. Therefore, it is possible to disperse the load of the transmission lines, and avoid local traffic congestion.

In the above embodiment, the load of the transmission lines is dispersed to the whole 368 nodes. According to the present invention, it is also possible to disperse the load of the transmission lines that are connected to each center router to the nodes of each center router independent of other center routers, based on a parallel processing of the monitoring unit.

Further, in the embodiment shown in FIG. 1, the network between the monitoring unit and the nodes has a tree shape as a physical mode. However, in the present invention, it is also possible to employ a star shape as a physical mode.

Further, in the above embodiment, the monitoring unit has been explained as an example. It is also possible to apply the present invention to various other cases. For example, it is possible to apply the invention to a case in which resources are distributed to a plurality of nodes that are connected to the central computer via a broadband network, or a case in which a predetermined job is started at each node.

Next, the processing of a program that has been recorded on a recording medium to be used for the system for dispersing the load of a network according to the present invention will be explained.

A central computer that executes the system for dispersing the load of a network according to the present invention includes a communication order determining unit and a communication interval determining unit. Further, the central computer includes a central processing unit, a main memory unit like a RAM as a recording medium, an auxiliary memory unit like a magnetic disk as a recording medium, and a monitoring unit. A central processing unit (CPU) incorporates reading units for a portable recording medium like a CD-ROM and for a floppy disk. The CPU reads a program, for making the computer function as various units of the present invention recorded on the portable recording medium like the CD-ROM and the floppy disk, via the reading unit, based on a predetermined operation. The CPU loads the read program onto the main memory unit. It is of course possible to arrange such that an operator directly writes the program onto the main memory unit of the central computer via an input unit like a keyboard and a mouse, and installs the program on the auxiliary memory unit. Alternatively, via a network (a communication line), the program stored in the auxiliary memory unit like a magnetic disk as a recording medium that is installed on the computer of other client is loaded onto the auxiliary memory unit of the central computer according to the present invention. Thereafter, the program stored in the auxiliary memory unit is loaded onto the main memory unit according to need, based on the processing of the central processing unit. The central processing unit executes the program written on the main memory unit, according to the needs.

As explained above, according to the present invention, it is possible to provide a system for dispersing the load of a network that can avoid local traffic congestion in a communication route within a broadband network, a method therefor, and a recording medium recorded with a program for executing this method, in data communications between a central computer and a plurality of remote nodes that are connected to this central computer via the broadband network.

Further, according to the present invention, when a plurality of remote nodes are divided into a plurality of transmission lines, the frequency of using the transmission lines is determined in proportion to the number of remote nodes that are connected to the transmission lines or in proportion to the line speed of each transmission line. Therefore, it becomes possible to disperse the load of the network more satisfactorily.

What is claimed is:

1. A system dispersing the load of a network in data communications between a monitoring unit and a plurality of remote nodes that are connected to the monitoring unit via a broadband network, wherein the monitoring unit comprises:

a communication order determining unit that determines an order of communications between the monitoring unit and the plurality of remote nodes, in order to avoid local traffic congestion in a communication route within the broadband network;

a communication interval determining unit that determines a communication interval between a remote node with which the monitoring unit communicates a first time and a different remote node with which the monitoring unit communicates a next time, among the plurality of remote nodes that communicate with the monitoring unit;

a communication control unit that controls data communications between the monitoring unit and the plurality of remote nodes, according to the communication order and the communication interval, said communication control unit selecting nodes associated with a transmission line to be polled based on a comparison of a first ratio and a second ratio, said first ratio represented by a total number of nodes divided by the number of nodes accommodated by the selected transmission line and said second ratio represented by the total number of nodes involved in the polling divided by the number of nodes polled in each of the transmission lines; and the communication interval determining unit determining the communication interval by dividing a repetition period, required for repetitively executing communications with all of the plurality of remote nodes, by a total number of the plurality of remote nodes, yielding a quotient from which is subtracted a processing time per single node thereby to obtain the communication interval, the communication interval including a communication waiting time.

2. The system dispersing the load of a network, according to claim 1, wherein:

the plurality of remote nodes is divided into groups, each group associated with a respective, individual transmission line and comprising plural remote nodes; and the operating frequency of each transmission line is increased in proportion to the number of remote nodes of the respective group with which the transmission line is used; and the monitoring unit further comprises a polling execution determining unit determining the order of transmission lines to be used for polling the divided nodes of the plural groups to be monitored, selecting one transmission line according to the determined order of the transmission lines to be used for the polling, judging whether the polling involved the number of nodes corresponding to the transmission line that has been selected;

and the comparison further comprising comparing a ratio of the total number of nodes, divided by the number of nodes accommodated by the selected transmission line, with a ratio of the total number of nodes involved in the polling divided by the number of nodes polled in each of the transmission lines; determining whether the polling in the transmission line should be executed, or not, executing the polling of one new node to be monitored and updating the total number of nodes involved in the polling and the number of polled nodes of each transmission line, and repeating the determining, selecting, judging, comparing, determining and executing of the polling execution determining unit.

3. The system for dispersing the load of a network according to claim 1, wherein:
the operating frequency of each transmission line is increased in proportion to the respective line speeds of the divided transmission lines.

4. A system dispersing the load of a network in a monitoring unit that carries out polling to a plurality of remote nodes, to be monitored, that are connected via a broadband network, wherein the monitoring unit comprises:
a polling order determining unit that determines an order of polling the plurality of nodes to be monitored;
a polling interval determining unit that determines a polling interval between the nodes to be monitored;
a control unit that controls the monitoring unit to carry out polling of the plurality of nodes to be monitored according to the polling order and the polling interval, said control unit selecting nodes associated with a transmission line to be polled based on a comparison of a first ratio and a second ratio, said first ratio represented by a total number of nodes divided by the number of nodes accommodated by the selected transmission line and said second ratio represented by the total number of nodes involved in the polling divided by the number of nodes polled in each of the transmission lines; and
a communication interval determining unit that determines a communication interval by dividing a repetition period, required for repetitively executing communications with all of the plurality of remote nodes, by a total number of the plurality of remote nodes, yielding a quotient from which is subtracted a processing time per single node thereby to obtain the communication interval, the communication interval including a communication waiting time.

5. A method of dispersing the load of a network in data communications between a monitoring unit and a plurality of remote nodes that are connected to the monitoring unit via a broadband network, the method comprising:
determining an order of communications between the monitoring unit and the plurality of remote nodes, in order to avoid local traffic congestion in a communication route within the broadband network;
determining a communication interval between a remote node with which the monitoring unit communicates a first time and a different remote node with which the monitoring unit communicates a next time, among the plurality of remote nodes that communicate with the monitoring unit;
controlling data communications between the monitoring unit and the plurality of remote nodes according to the communication order and the communication interval;
selecting nodes associated with a transmission line to be polled, based on a comparison of a first ratio and a second ratio, said first ratio represented by a total number of nodes divided by the number of nodes accommodated by the selected transmission line and said second ratio represented by the total number of nodes involved in the polling divided by the number of nodes polled in each of the transmission lines; and
determining the communication interval by dividing a repetition period, required for repetitively executing communications with all of the plurality of remote nodes, by a total number of the plurality of remote nodes, yielding a quotient from which is subtracted a processing time per single node thereby to obtain the communication interval, the communication interval including a communication waiting time.

6. The method of dispersing the load of a network, according to claim 5, wherein,
the plurality of remote nodes are divided into groups of a plurality of transmission lines, and
the frequency of using the transmission lines divided into the groups for communication is increased in proportion to the number of remote nodes that are accommodated in the divided groups of transmission lines; and
determining the order of transmission lines to be used for polling the divided nodes of the plural groups to be monitored, selecting one transmission line according to the determined order of the transmission lines to be used for the polling, judging whether the polling involved the number of nodes corresponding to the transmission line that has been selected;
and the comparison further comprises comparing a ratio of the total number of nodes, divided by the number of nodes accommodated by the selected transmission line, with a ratio of the total number of nodes involved in the polling divided by the number of nodes polled in each of the transmission lines; determining whether the polling in the transmission line should be executed, or not, executing the polling of one new node to be monitored and updating the total number of nodes involved in the polling and the number of the polled nodes of each transmission line, and repeating the determining, selecting, judging, comparing, determining and executing of the polling execution determining unit.

7. The method of dispersing the load of a network, according to claim 5, wherein:
the plurality of remote nodes are divided into groups of a plurality of transmission lines, and
the frequency that the transmission lines divided into the groups are used for communications is increased in proportion to the line speeds of the divided transmission lines; and further comprising:
determining the communication interval by dividing a repetition period, required for repetitively executing communications with all of the plurality of remote nodes by a total number of the plurality of remote nodes, yielding a quotient from which is subtracted a processing time per single node thereby to obtain the communication interval, the communication interval including a communication waiting time.

8. A method of dispersing the load of a network in a monitoring unit that carries out polling to a plurality of nodes to be monitored that are connected via a broadband network, the method comprising:
determining an order of polling the plurality of nodes to be monitored;
determining a polling interval between the nodes to be monitored; and
controlling the monitoring unit to carry out polling of the plurality of nodes to be monitored, according to the polling order and the polling interval;

selecting nodes associated with a transmission line to be polled based on a comparison of a first ratio and a second ratio, said first ratio represented by a total number of nodes divided by the number of nodes accommodated by the selected transmission line and said second ratio represented by the total number of nodes involved in the polling divided by the number of nodes polled in each of the transmission lines; and determining a communication interval by dividing a repetition period, required for repetitively executing communications with all of the plurality of remote nodes by a total number of the plurality of remote nodes, yielding a quotient from which is subtracted a processing time per single node thereby to obtain the communication interval, the communication interval including a communication waiting time.

9. A computer-readable recording medium recorded with a program that is used in a system dispersing the load of a network in data communications between a monitoring unit and a plurality of remote nodes that are connected to the monitoring unit via a broadband network, wherein:

the recording medium has been recorded with a program for making the monitoring unit function as:

a communication order determining unit that determines an order of communications between the monitoring unit and the plurality of remote nodes, in order to avoid local traffic congestion in a communication route within the broadband network;

a communication interval determining unit that determines a communication interval between a remote node with which the monitoring unit communicates this time and a different remote node with which the monitoring unit communicates next time, among the plurality of remote nodes that communicate with the monitoring unit; and a communication control unit that controls data communications between the monitoring unit and the plurality of remote nodes, according to the communication order and the communication interval and determines the communication interval by dividing a repetition period, required for repetitively executing communications with all of the plurality of remote nodes by a total number of the plurality of remote nodes, yielding a quotient from which is subtracted a processing time per single node thereby to obtain the communication interval, the communication interval including a communication waiting time, said communication control unit selecting nodes associated with a transmission line to be polled based on a comparison of a first ratio and a second ratio, said first ratio represented by a total number of nodes divided by the number of nodes accommodated by the selected transmission line and said second ratio represented by the total number of nodes involved in the polling divided by the number of nodes polled in each of the transmission lines.

10. A system for dispersing the load of a network in a monitoring unit that carries out polling to a plurality of nodes to be monitored that are connected via a broadband network, wherein:

the monitoring unit comprises:

a polling order determining unit that determines an order of polling the plurality of nodes to be monitored;

a polling interval determining unit that determines a polling interval between the nodes to be monitored; and a control unit that controls the monitoring unit to carry out polling of the plurality of nodes to be monitored, according to the polling order and the polling interval and determines the order of transmission lines to be used for polling the divided nodes of the plural groups to be monitored, selecting one transmission line according to the determined order of the transmission lines to be used for the polling, judging whether the polling involved the number of nodes corresponding to the transmission line that has been selected; comparing a ratio of the total number of nodes, divided by the number of nodes accommodated by the selected transmission line, with a ratio of the total number of nodes involved in the polling divided by the number of nodes polled in each of the transmission lines; determining whether the polling in the transmission line should be executed, or not, executing the polling of one new node to be monitored and updating the total polling number and the polling number for each transmission line, and repeating said determining, selecting, judging, comparing, determining and executing of the polling execution determining unit.

11. A method of dispersing the load of a network in a monitoring unit that carries out polling to a plurality of nodes to be monitored that are connected via a broadband network, the method comprising:

determining an order of polling the plurality of nodes to be monitored;

determining a polling interval between the nodes to be monitored; and controlling the monitoring unit to carry out polling of the plurality of nodes to be monitored, according to the polling order and the polling interval; and determining the order of transmission lines to be used for polling divided nodes of the plural groups to be monitored, selecting one transmission line according to a determined order of the transmission lines to be used for the polling, judging whether the polling involved the number of nodes corresponding to the transmission line that has been selected; comparing a ratio of the total number of nodes, divided by the number of nodes accommodated by the selected transmission line, with a ratio of the total number of nodes involved in the polling divided by the number of nodes polled in each of the transmission lines; determining whether the polling in the transmission line should be executed, or not; executing the polling of one new node to be monitored and updating the total number of nodes involved in the polling and the number of the polled nodes of each transmission line, and repeating said determining, selecting, judging, comparing, determining and executing of the polling execution determining unit.

12. A computer-readable recording medium recorded with a program that is used in a system for dispersing the load of a network in data communications between a monitoring unit and a plurality of remote nodes that are connected to the monitoring unit via a broadband network, wherein:

the recording medium has been recorded with a program for making the monitoring unit function as:

a communication order determining unit determining an order of communications between the monitoring unit and the plurality of remote nodes, in order to avoid local traffic congestion in a communication route within the broadband network a communication interval determining unit determining a communication interval between a remote node with which the monitoring unit communicates this time and a remote node with which the monitoring unit communicates next time, among the plurality of remote nodes that communicate with the monitoring unit; and a communication control unit controlling data communications between the monitoring unit and the plurality of remote nodes, according to the communication order and the communication interval; and a polling execution determining unit determining the order of transmission lines to be used for polling the divided nodes of the plural groups to be monitored, selecting one transmission line according to the determined order of the transmission lines to be used for the polling, judging whether the polling involved the number of nodes corresponding to the transmission line that has been selected; comparing a ratio of the total number of nodes, divided by the number of nodes accommodated by the selected transmission line, with a ratio of the total number of nodes involved in the polling divided by the number of nodes polled in each of the transmission lines; determining whether the polling in the transmission line should be executed, or not, executing the polling of one new node to be monitored and updating the total number of nodes involved in the polling and the number of the polled nodes of each transmission line, and repeating said determining, selecting, judging, comparing, determining and executing of the polling execution determining unit.

* * * * *

UNITED STATES PATENT AND TRADEMARK OFFICE
CERTIFICATE OF CORRECTION

| | |
|---|---|
| PATENT NO. | : 7,305,003 B2 |
| APPLICATION NO. | : 10/075027 |
| DATED | : December 4, 2007 |
| INVENTOR(S) | : Yoshikazu Aoki |

It is certified that error appears in the above-identified patent and that said Letters Patent is hereby corrected as shown below:

Column 12, Line 62, after "network" insert --;--.

Signed and Sealed this

Twentieth Day of May, 2008

JON W. DUDAS
*Director of the United States Patent and Trademark Office*